United States Patent [19]
Eastman et al.

[11] Patent Number: 5,440,534
[45] Date of Patent: Aug. 8, 1995

[54] METHOD AND APPARATUS FOR MAINTAINING A RECORDING LIGHT BEAM IN AN ON-TRACK POSITION ON A RECORDING MEDIUM

[75] Inventors: Clarke K. Eastman, Rochester; Daniel L. Nelson; Gerald J. Smart, both of Penfield, all of N.Y.

[73] Assignee: Eastman Kodak Company, Rochester, N.Y.

[21] Appl. No.: 179,474

[22] Filed: Jan. 10, 1994

[51] Int. Cl.6 .............................................. G11B 7/09
[52] U.S. Cl. ............................ 369/44.27; 369/44.31; 369/54
[58] Field of Search ............... 369/44.29, 44.26, 44.34, 369/44.35, 44.36, 44.25, 54, 44.32, 44.27, 44.31, 44.37, 44.38; 250/201.5

[56] References Cited
U.S. PATENT DOCUMENTS

| | | | |
|---|---|---|---|
| 4,707,816 | 11/1987 | Yonezawa et al. | 369/44.26 |
| 4,748,609 | 5/1988 | Yonezawa et al. | 369/44.26 |
| 4,977,551 | 12/1990 | Minami et al. | 369/44.36 |
| 5,033,040 | 7/1991 | Fujita | 369/44.37 |
| 5,251,194 | 10/1993 | Yoshimoto et al. | 369/44.34 X |

Primary Examiner—W. R. Young
Attorney, Agent, or Firm—James D. Leimbach

[57] ABSTRACT

A method and apparatus for, in an optical data recorder, maintaining a recording light beam in an on-track position on a recording medium. In the apparatus an optical head has a tracking arrangement movable in a direction parallel to the recording medium for changing the tracking position of the recording light beam on the recording medium. The method comprises the steps of: i) detecting light reflected from the optical recording medium and producing a corresponding tracking error signal; ii) generating a mark formation effectiveness signal for each of a plurality of trial tracking positions, each mark formation effectiveness signal being associated with a given value of the tracking error signal; iii) determining the mark formation effectiveness signal corresponding to an on-track position and determining an on-track the value of the associated tracking error signal; and iv) during data recording periods, in response to the tracking error signal, adjusting the position of the movable tracking means so that the on-track value of the tracking error signal is maintained.

10 Claims, 6 Drawing Sheets

METHOD AND APPARATUS FOR MAINTAINING A RECORDING LIGHT BEAM IN AN ON-TRACK POSITION ON A RECORDING MEDIUM

CROSS REFERENCE TO RELATED APPLICATIONS

The present invention is related to the following U.S. patent applications: "Write Verification In An Optical Recording System By Sensing Mark Formation While Writing" Ser. No 08/179,472; "Laser Power Control In An Optical Recording System Using Partial Correction Of Reflected Signal Error", Ser. No. 08/179,476; "Laser Power Control To Compensate For Multiple System Degradations", Ser. No. 08/179,394; and "Method And Apparatus For Focusing A Recording Light Beam On A Recording Medium", Ser. No. 08/179,477, all filed concurrently with the present application, assigned to the assignee of the present invention, the disclosures of which are incorporated herein by reference.

FIELD OF THE INVENTION

The present invention relates to optical data recorders, and more particularly to maintaining a recording light beam in an on-track position on a recording medium.

DESCRIPTION OF THE PRIOR ART

High density optical recording is becoming more and more prevalent and such systems typically employ a light beam which is focused on a recording medium to produce a pit or a mark. Such high density optical recording systems require precise positioning of the recording light beam on the recording medium. In many applications, this is accomplished by a pre-existing pattern or tracking structure in the medium. Examples of this pre-formatting are the manufactured-in pregrooves of writable CDs and the previously recorded tracking pads of the Kodak 6800 optical disk system. FIG. 1 schematically represents a cross section of an optical recording medium, such as that used in a recordable CD. As shown in FIG. 1, the optical recording medium comprises a transparent substrate 1 provided on one of its faces with a groove structure 3. The grooves are filled with an absorptive dye 2 which absorbs light from the recording light beam 5 and in which the recorded marks are formed. The grooves also provide the tracking structure mentioned above. A gold layer 4 is provided over the dye layer and provides the high reflectivity required for playback purposes. A protective layer 6 is coated over the gold layer. The pattern of light reflected and/or diffracted by such structures is converted by the optical head to produce an electrical signal. Typically, an optical beam from a light source, such as a laser diode, is reflected by the recording medium and in turn illuminates two or more photodetectors. Differences in tracking positions produce variations in the illumination pattern on these photodetectors. As a result of differences in illumination, the photodetectors produce different signals, from which a tracking error signal is computed. The tracking error signal indicates the position of the illuminated spot relative to the pre-formatted structure. The write tracking "offset" is defined as the tracking error signal which occurs when the recording beam is on-track. The tracking offset will also be referred to herein as an on-track value. If the tracking error signal during data recording is different from a predetermined offset value, then there is an error and the position of the optical head is adjusted. For good quality recording in high data density systems, such as recordable CDs, this tracking offset value must be determined accurately. The tracking offset is typically determined empirically for each optical head to compensate for optical alignment inaccuracies. One way this has been accomplished is to read back previously recorded media while monitoring one or more parameters such as amplitude or phase margin. During read back, the tracking offset is varied over a given range, and the offset value corresponding to the best read back parameters is chosen as the optimum offset value. This method is based on the assumption that the optimum tracking offset is the same for recording and reading. This may not be a valid assumption for several reasons. For example, illumination powers for recording are significantly higher than for reading. This may affect the response of sensor elements and/or signal processing electronics. There are also physical changes which occur in the optical medium during recording which of course do not occur during reading. Furthermore, tracking signals produced from recorded marks and from unrecorded media such as recordable CDs may be significantly different.

Another approach has been to actually record on media at a variety of tracking offsets. When the recorded data is read back, the tracking offset that resulted in the "best" recorded quality is chosen to be the optimum offset value. This second method is advantageous in that the tracking error signal which is used for the calibration is generated by the same medium structure that will be used during subsequent recordings. Unfortunately, this second method is more complicated to implement since it requires both record and read back steps.

Another specific approach, described in U.S. Pat. Nos. 4,748,609 and 4,707,816, requires a recording medium with previously written "staggered" marks to act as tracking guides during subsequent recording. Many formats, such as recordable CDs, do not allow such structures on the medium.

In another approach, disclosed in U.S. Pat. No. 5,033,040, a single recording beam is used along with three readback beams. The relative intensities of two staggered readback beams and the tracking error signal of the third readback beam are used to calibrate the tracking error signal of the recording beam. In addition to the drawbacks of the other methods described above, this method is complicated to implement and relies on an accurate alignment of multiple beams.

SUMMARY OF THE INVENTION

It is an object of this invention to provide, in an optical data recorder, an improved way for determining the desired offset value to be used in maintaining a recording light beam in an on-track position on an optical recording medium.

This object is achieved in an optical data recorder for maintaining a recording light beam in an on-track position on an optical recording medium having a tracking structure, the improvement comprising:
 an optical head including a recording light beam, the head having tracking means movable in a direction parallel to the recording medium surface for changing the position of the recording light beam with respect to the tracking structure as the recording light beam writes data on said optical recording medium;

tracking sensing means for detecting light reflected from the optical recording medium as the recording light beam writes on the optical recording medium and for producing a corresponding tracking error signal;

means for, during calibration periods, generating a mark formation effectiveness signal for each of a plurality of trial tracking positions, each mark formation effectiveness signal being associated with a given value of the tracking error signal of the tracking sensing means;

means for determining the mark formation effectiveness signal corresponding to an on-track position of the recording light beam on the tracking structure and for determining an on-track value of the associated tracking error signal; and means responsive to the tracking error signal during data recording periods for adjusting the position of the movable tracking means so that the value of the tracking error signal is maintained at said on-track value.

The above object is also achieved in a method for, in an optical data recorder having an optical head including a recording light beam, maintaining the recording light beam in an on-track position on an optical recording medium having a tracking structure, the optical head having tracking means movable in a direction parallel to the optical recording medium for changing the position of the recording light beam with respect to the tracking structure as it writes data on the optical recording medium, the method comprising the steps of:

detecting light reflected from the optical recording medium as the recording light beam writes on the optical recording medium, and producing a corresponding tracking error signal;

during calibration periods, generating a mark formation effectiveness signal for each of a plurality of trial tracking positions, each mark formation effectiveness signal being associated with a given value of the tracking error signal;

determining the mark formation signal effectiveness corresponding to an on-track position of the recording light beam on the optical recording medium, and determining an on-track value of the associated tracking error signal; and adjusting, during data recording periods, in response to the focus error signal, the position of the movable tracking means so that the value of the tracking error signal is maintained at the on-track value.

The following are advantages of the invention. Desired tracking offset values can be determined during the actual recording process, and accurate offset values can be obtained in a more efficient and simpler way than in the devices and processes of the prior art. The present invention provides more accuracy than in the prior art arrangement in which the assumption was made that the offset value was the same in readback as in recording.

Further features of the invention, its nature and various advantages will become more apparent from the accompanying drawings wherein like characters indicate like parts and following detailed description of the invention.

DESCRIPTION OF THE PREFERRED EMBODIMENTS

Figure 1:
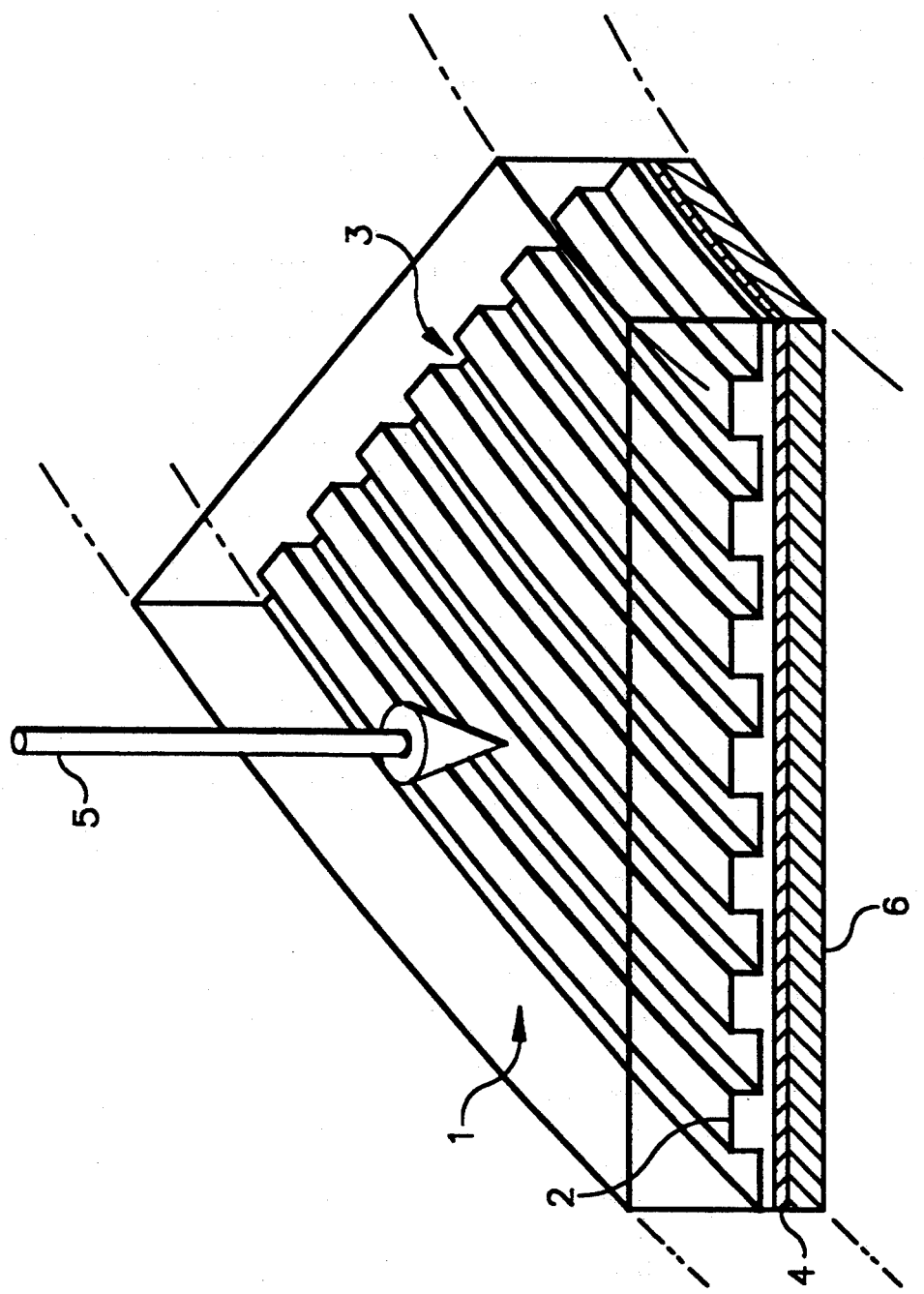
FIG. 1 is a cross section of a prior art recording medium having a tracking structure which can be suitably used as the recording medium in conjunction with the present invention.
Figure 2:
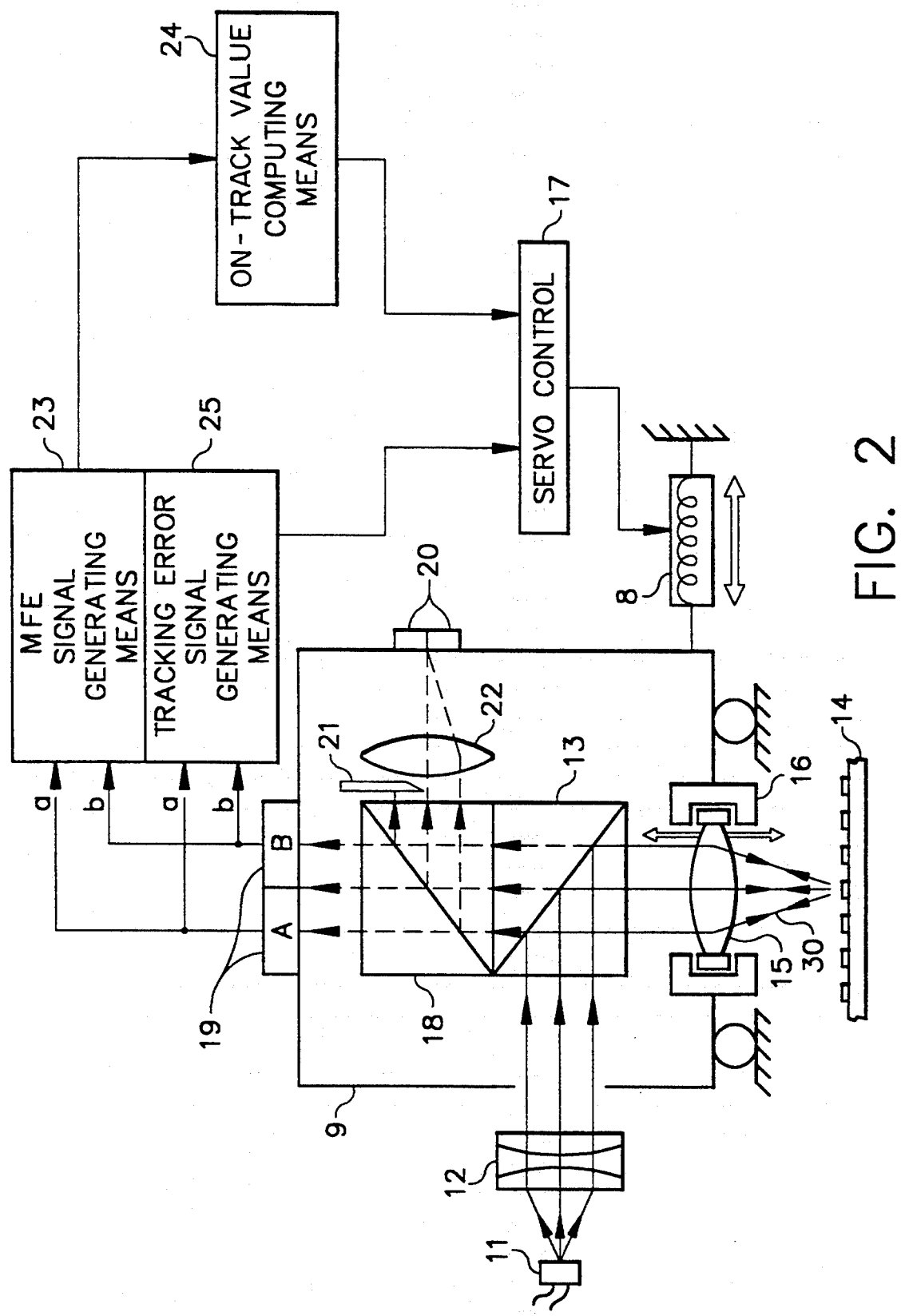
FIG. 2 is a schematic of an optical data recording head for maintaining a recording light beam in an on-track position on an optical recording medium in accordance with the present invention.

FIG. 2 shows the main parts of an optical data recorder 10. Such an optical data recorder mainly comprises an optical head having an optical source 11 for generating a recording light beam. Typically, the recording light beam is a laser light beam. Light emitted from the optical source 11 first passes through collimating and beam shaping optics 12 and then passes through a first beam splitter 13 at which it is reflected toward the optical recording medium 14 for recording purposes, through a focusing lens 15. The recording medium 14 can be comprised of, for example, a recordable CD optical disk. Such a recording medium preferably includes a tracking structure of the type described herebefore in reference to FIG. 1.

The focusing lens 15 is mounted on a focus actuator 16 which is designed to move the focusing lens in a direction perpendicular to the recording medium surface for changing the focus of the recording light beam on the optical recording medium. A tracking actuator 8 is used to move those parts of the head, such as the focusing lens 15, the beam splitters, and the photodetector assemblies which are included in a housing 9 so that the recording beam can be moved laterally across the recording medium 14 in order to maintain the beam in an on-track position with respect to the tracking structure of the recording medium 14. Tracking and focus actuators 8 and 16 may include, for example, different well-known arrangements of coils and electro-magnets (not shown) which are controlled by a servo control system 17 to be discussed in detail below. Alternatively, the tracking function may be accomplished by moving only the focusing lens 15. While this alternative may introduce additional complexity in the interpretation of the tracking error signal, methods of dealing with such a situation are well known in the art.

The light reflected from the recording medium 14 passes through the lens 15, the first beam splitter 13 and a second beam splitter 18 at which the reflected beam is divided into two main components. A first component of the reflected beam is sent to a tracking reflected light photodetector assembly 19 which produces tracking information as well as information regarding the reflectivity of the medium 14. Typically, the tracking error signal is the result of the difference between the electrical signal a produced by photodetector A and the electrical signal b produced by photodetector B. The signal representative of the reflectivity of the medium is obtained by summing the electrical signals produced by both photodetectors A and B. The other component of the reflected light falls on a focus photodetector assembly 20 through a collimating lens 22 and a limiting aperture 21. The focus photodetector assembly 20 is used to generate a focus error signal for controlling the position of the focusing lens 15. As an alternative, the focus and tracking signals could be generated by a single photodetector assembly.

Figure 3C:
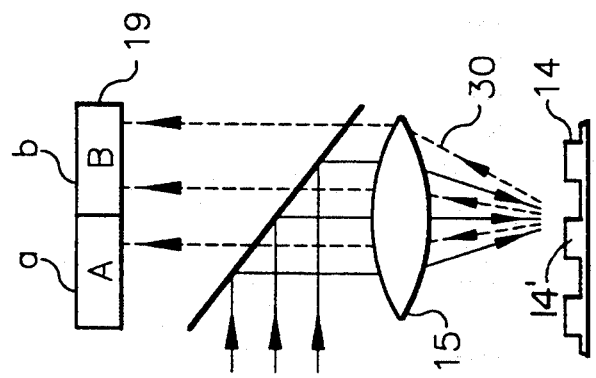
FIGS. 3A–3C illustrate schematically the amount of light received by the tracking sensing arrangement used in an apparatus according to the present invention for different tracking positions.
Figure 3B:
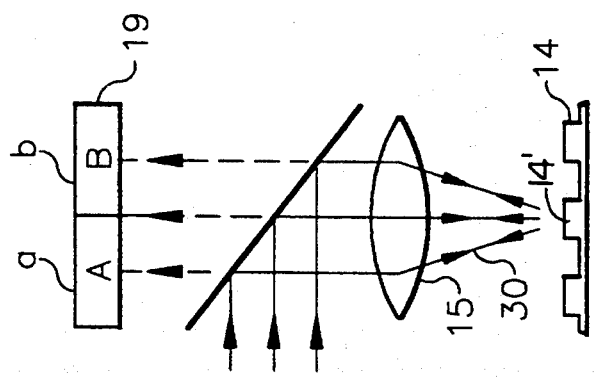
Figure 3A:
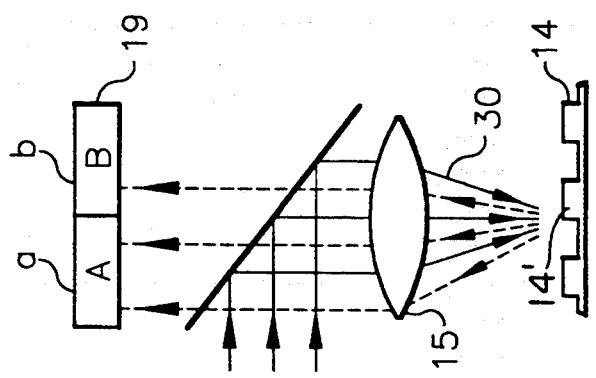

FIGS. 3A–3C illustrate an exemplary embodiment of a tracking photodetector assembly 19 which can be used in accordance with the present invention. As it appears from FIGS. 3A–3C, the tracking photodetector assembly 19 comprises two adjacent photodetectors A, B. Silicon photodiodes, such as positive-intrinsic-negative (PIN) or avalanche photodiodes, may be used for photodetectors A, B. It should be understood that a different number of photodetectors may also be used. Each of the photodetectors receives an amount of light which depends on the position of the recording beam 30 relative to the tracking structure on the medium 14. The light received by the photodetectors A, B is converted into electrical signals a, b, respectively.

As shown in FIGS. 3A–3C, as the recording beam 30 moves relative to a tracking structure 14' of medium 14, the relative distribution of illumination at the photodetectors A and B varies. In FIG. 3A, the recording beam falls predominantly on the left side of the tracking structure 14' so that a greater amount of reflected light is received by photodetector A than by photodetector B. In FIG. 3B, the recording beam is centered relative to the tracking structure 14' so that substantially the same amount of reflected light is received by both photodetectors A and B. In FIG. 3C, the recording beam falls predominantly on the right side of the tracking structure 14' so that a greater amount of reflected light is received by photodetector B.

Figure 4:
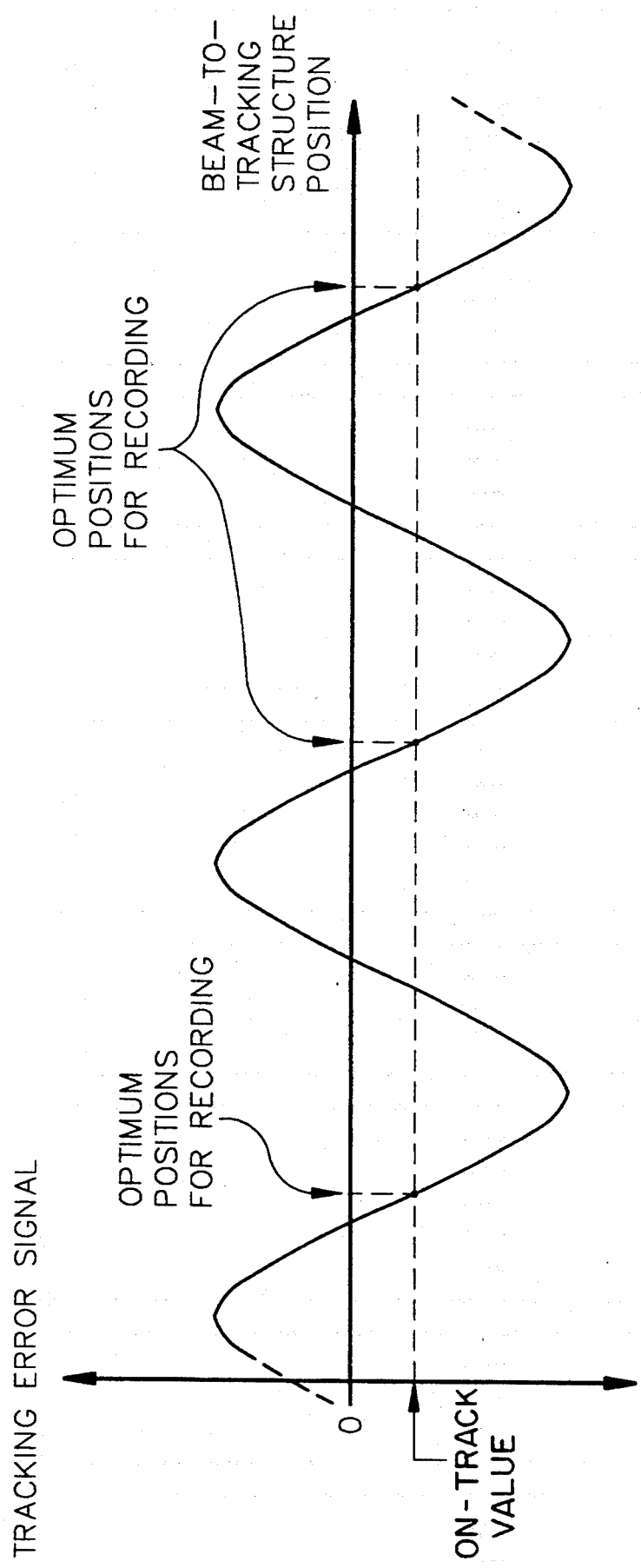
FIG. 4 is a graph illustrating the tracking error signal as a function of the tracking position.

A tracking error signal is produced by the photodetector assembly 19. An exemplary tracking error signal may be generated as the difference between the signals a and b produced by the photodetectors A and B, respectively. As an alternative, a normalized tracking error signal may be generated by dividing (a−b) by (a+b). An advantage of the normalized tracking error signal is that it does not depend on the absolute amount of reflected light. It depends only on the relative illumination of the photodetectors A and B. FIG. 4 shows the tracking error signal as a function of the beam-to-tracking-structure position. The tracking error signal is periodic because of the periodic nature of the tracking structure. The optimum position of the recording beam relative to the tracking structure for optimum recording, i.e. the on-track position of the beam on the medium, is a position for which the on-track value of the tracking error signal is slightly different from zero. This is due to the fact that the alignment of the photodetectors is usually not perfect. In other words, an on-track situation corresponds to a tracking error signal, the on-track value, which can be different from zero. Accordingly, in order to maintain the recording device in an on-track position, the on-track value of the tracking error signal has to be determined. This value is measured during calibration periods which can be performed each time the on-track value is not known or might have changed. Usually, such a calibration is performed as part of the manufacturing process of the optical data recorder, or during the initialization of the recorder.

In accordance with one embodiment of the present invention, the on-track value is determined by generating a mark formation effectiveness (MFE) signal for each of several beam-to-tracking structure positions.

Figure 5A:
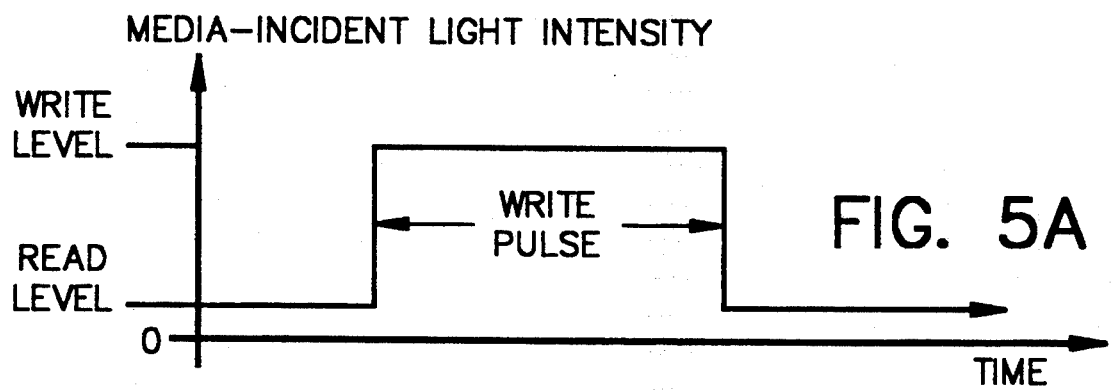
FIGS. 5A–5D illustrate an exemplary reflected write pulse for which a mark formation effectiveness (MFE) signal may be generated in accordance with the present invention.
Figure 5B:
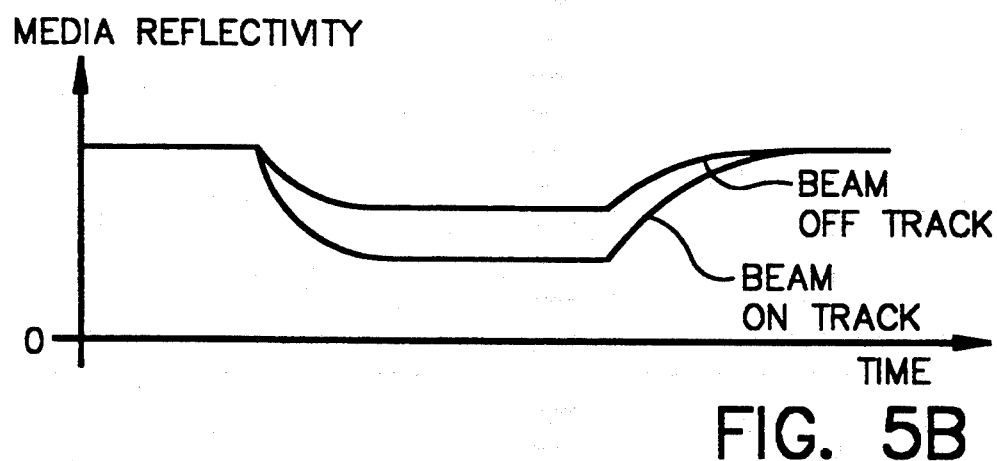
Figure 5C:
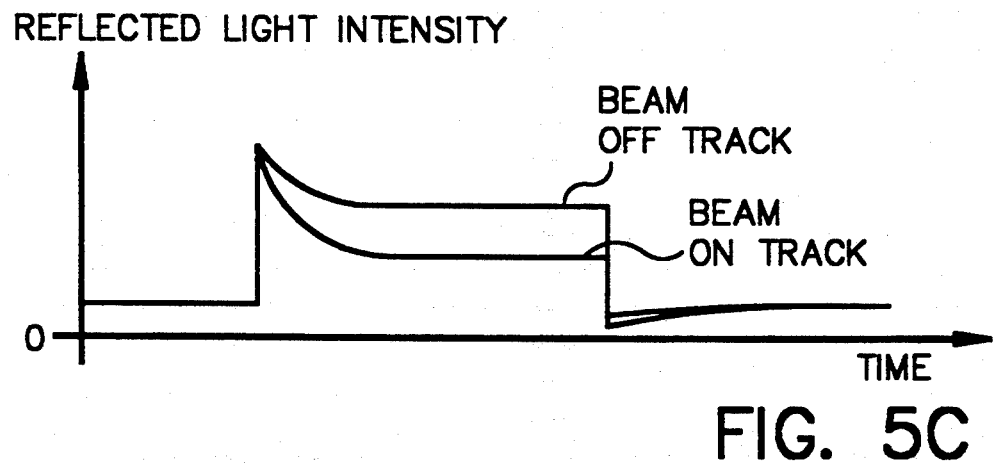
Figure 5D:
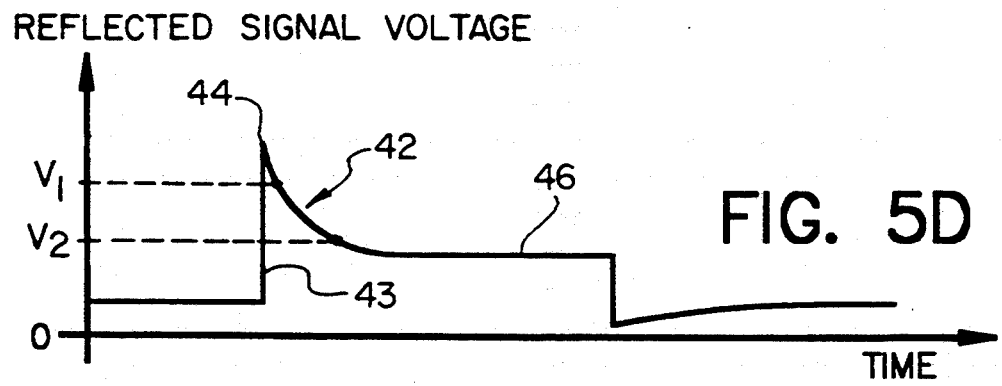

FIGS. 5A–5D illustrate the generation of MFE signals, by a direct read during write (DRDW) process. FIG. 5A shows an incident write pulse with write and read power levels. FIG. 5B is a graph illustrating the medium reflectivity versus time, i.e. before, during and after a write pulse for both off-track and on-track conditions. The medium used in the illustrated embodiment is a "burn dark" medium, and therefore the medium reflectivity decreases during the write pulse. The same principle could be used for a "burn bright" medium, for which an increase in reflectivity would be observed during the write pulse. In a "burn dark" medium, reflectivity decreases by a greater extent when the recording beam is on-track than when the recording beam is off-track. FIG. 5C is a graph of an exemplary reflected write pulse signal as a function of time for off-track and on-track conditions. The reflected write signal includes a reflected write pulse. Such a reflected write pulse can be generated, for example, from the signals issued from the tracking photodetector assembly 19 shown in FIG. 2. As shown in FIG. 5D, an exemplary reflected write pulse 42 decreases from an initial peak voltage 44 at a rising edge 43 of the write pulse 42, to a steady-state plateau voltage 46. The plateau voltage 46 is typically higher for an off-track position than for an on-track position, as shown in FIG. 5C. An MFE signal, which varies with a rate of change of the reflected pulse 42 as a mark is formed on the optical medium, may be determined from the voltages $V_1$ and $V_2$ shown in FIG. 5D. Exemplary MFE signals include the quotient $V_1/V_2$, or the difference between $V_1$ and $V_2$. The MFE signal $V_1/V_2$ corresponds to one exemplary type of reflected pulse rate of change, the decay rate of the reflected write pulse between the peak voltage 44 and the plateau voltage 46. Various linear and non-linear transformations of the quotient $V_1/V_2$ may also be used as MFE signals herein.

As shown in FIG. 5D, the first and second voltages $V_1$ and $V_2$ are presently preferred to be voltages on the decaying portion of the reflected pulse. Alternatively, the first voltage $V_1$ used to compute the MFE signal may be the peak voltage 44 of the reflected pulse, and the second voltage $V_2$ may be the plateau voltage. Additional detail regarding MFE signals suitable for use with the present invention may be found in the above-cited U.S. patent application Ser. No. 08/179,472.

Figure 6:
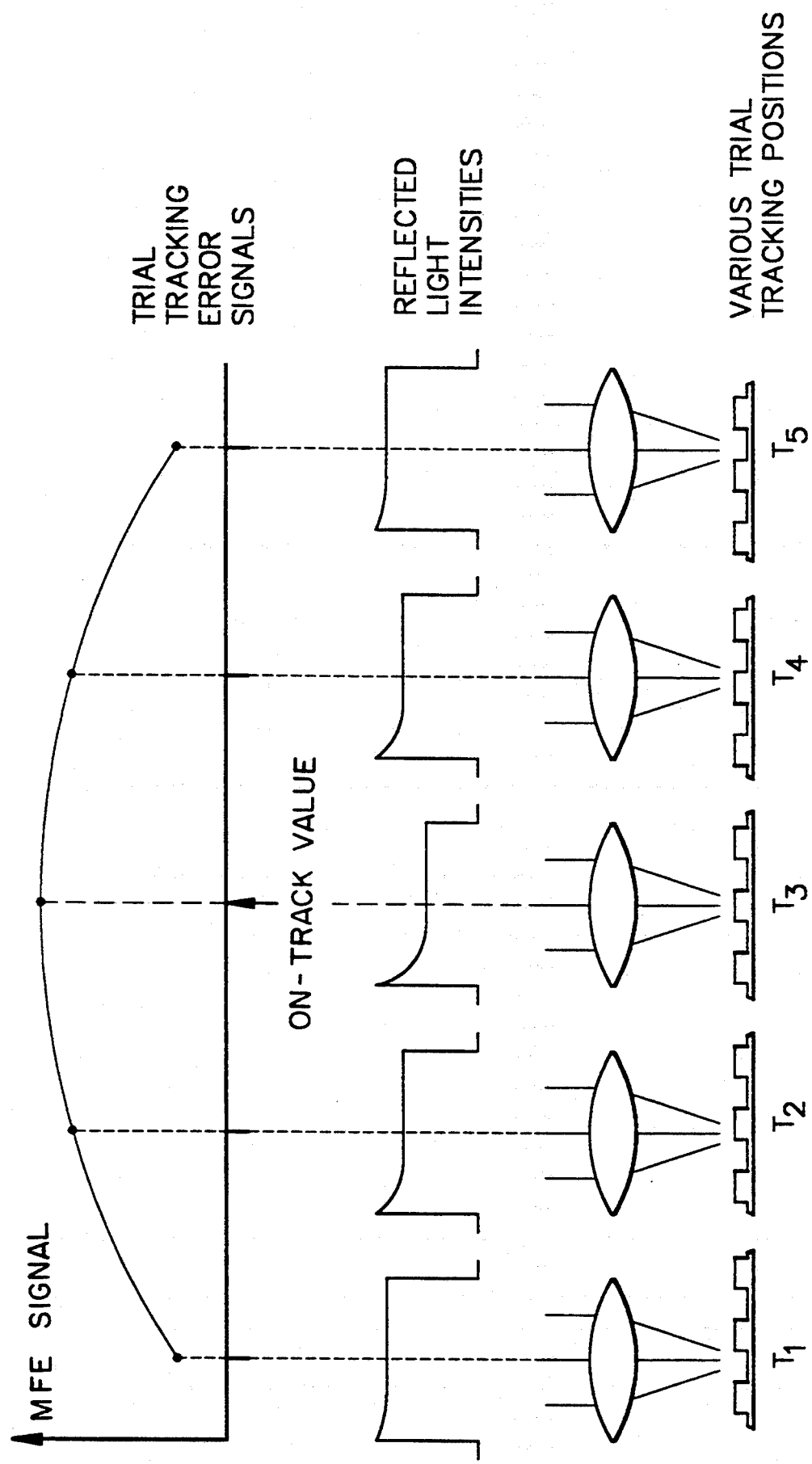
FIG. 6 illustrates different MFE signals for different trial tracking positions.

In one embodiment of the present invention, MFE signal generating means are used to compute an MFE signal. The MFE signal generation process is repeated for various trial tracking positions, $T_1$ to $T_5$, i.e. for different beam-to-tracking structure positions, as illustrated in FIG. 6. An MFE signal is computed for each of the trial tracking positions, and each of the MFE signals is associated with a corresponding value of the tracking error signal. Processor means, such as a computer or programmed microprocessor, are then used to determine the best MFE signal along with its associated tracking error signal, the on-track value of the tracking error signal.

Referring back to FIG. 2, in response to the on-track value previously determined by the MFE signal generating means 23 and by the on-track value computing means 24, and in response to the tracking error signal provided by the tracking error signal generating means 25 during actual data recording periods, the servo control 17 adjusts the position of the recording beam through the tracking actuator 8 so that the tracking error signal produced by the photodetector assembly 19 is restored to and maintained at the on-track value corresponding to the on-track position, as determined herebefore.

The recording light beam may be used to determine the on-track during the calibration process. Alternatively, a light beam other than the recording light beam could be used. For example, in an optical recorder based on the direct read after write (DRAW) method, data which have been recorded using a first laser light beam are read using a second laser light beam which closely follows the first one. In a DRAW system, the second laser light beam could be used for determining the on-track value.

As is apparent from the foregoing description, the method according to the invention is advantageous in that it does not require a separate read-back step to evaluate the quality of the recording process and to determine the best on-track values.

The invention has been described in detail with particular reference to certain exemplary embodiments thereof, but it will be understood that variations and modifications can be effected within the spirit and scope of the invention.

PARTS LIST

A photodetector
B photodetector
$T_1$ trial tracking position
$T_2$ trial tracking position
$T_3$ trial tracking position
$T_4$ trial tracking position
$T_5$ trial tracking position
a electrical signal produced by A
b electrical signal produced by B
8 tracking actuator
9 housing
10 optical data recorder head
11 optical source
12 collimating beam shaping optics
13 first beam splitter
14 optical recording medium
14' tracking structure of medium
15 focusing lens
16 focusing actuator
17 servo control system
18 second beam splitter
19 photodetector assembly
20 focus photodetector assembly
21 limiting aperture
22 collimating lens
23 mark formation signal generating means
24 on-track value computing means
25 focus error signal computing means
30 recording beam
42 reflected write pulse
43 reflected write pulse rising edge
44 reflected write pulse peak voltage
46 reflected write pulse plateau voltage

What is claimed is:

1. In an optical data recorder for maintaining a recording light beam in an on-track position on an optical recording medium having a tracking structure, the improvement comprising:

an optical head including a recording light beam, such head having tracking means movable in a direction parallel to the recording medium surface for changing the position of the recording light beam with respect to said tracking structure as it writes data on said optical recording medium;

tracking sensing means for detecting light reflected from said optical recording medium as said recording light beam writes on said optical recording medium and for producing, during recording, a corresponding tracking error signal;

means for generating a mark formation effectiveness signal While recording at each of a plurality of trial tracking positions, each mark formation effectiveness signal being associated with a given value of the tracking error signal of said tracking sensing means;

means for determining the mark formation effectiveness signal corresponding to an on-track position of said recording light beam on said tracking structure and for determining an on-track value of the tracking error signal; and means responsive to said tracking error signal during data recording for adjusting the position of said movable tracking means so that the on-track value of said tracking error signal is maintained.

2. The recorder of claim 1 wherein said mark formation effectiveness signal varies with a rate of change of a reflected write pulse, said rate of change resulting from variation in a reflectivity of said optical recording medium as a mark is formed thereon.

3. The recorder of claim 2 wherein a voltage level of said reflected write pulse decreases as a function of time from a first voltage to a second voltage during formation of said mark, and said rate of change is a decay rate of said voltage level from said first to said second voltage.

4. The recorder of claim 3 wherein said mark formation effectiveness signal is a quotient of said first voltage and said second voltage.

5. The recorder of claim 3 wherein said mark formation effectiveness signal is a transformation of a quotient of said first and second voltage.

6. A method for, in an optical data recorder having an optical head including a recording light beam, maintaining said recording light beam in an on-track position on an optical recording medium having a tracking structure, said optical head having tracking means movable in a direction parallel to said optical recording medium for changing the position of said recording light beam with respect to said tracking structure as said recording light beam writes data on said optical recording medium, the method comprising the steps of:

detecting light reflected from said optical recording medium as said recording light beam writes on said optical recording medium, and producing a corresponding tracking error signal during recording;

generating a mark formation effectiveness signal while recording at each of a plurality of trial tracking positions, each mark formation effectiveness signal being associated with a given value of said tracking error signal;

determining the mark formation effectiveness signal corresponding to an on-track position of said recording light beam on said optical recording medium;

determining an on-track value of the associated tracking error signal; and adjusting, during data recording periods, in response to said tracking error signal, the position of said movable tracking means so that the on-track value of said tracking error signal is maintained.

7. The method of claim 6, wherein the step of generating a mark formation effectiveness signal includes detecting a rate of change of a reflected write pulse, said rate of change resulting from variation in a reflectivity of said optical recording medium as a mark is formed thereon.

8. The method of claim 7 wherein a voltage level of said reflected write pulse decreases as a function of time from a first voltage to a second voltage during formation of said mark, and said rate of change is a decay rate of said voltage level from said first to said second voltage.

9. The method of claim 8 wherein said mark formation effectiveness signal is a quotient of said first voltage and said second voltage.

10. The method of claim 8 wherein said mark formation effectiveness signal is a transformation of a quotient of said first and second voltage.

* * * * *